(12) United States Patent
Dennis

(10) Patent No.: US 8,602,133 B2
(45) Date of Patent: Dec. 10, 2013

(54) TOOL WITH WELDED CEMENTED METAL CARBIDE INSERTS WELDED TO STEEL AND/OR CEMENTED METAL CARBIDE

(75) Inventor: Mahlon D. Dennis, Houston, TX (US)

(73) Assignee: Dennis Tool Company, Houston, TX (US)

(*) Notice: Subject to any disclaimer, the term of this patent is extended or adjusted under 35 U.S.C. 154(b) by 595 days.

(21) Appl. No.: 12/793,369

(22) Filed: Jun. 3, 2010

(65) Prior Publication Data
US 2011/0297449 A1 Dec. 8, 2011

(51) Int. Cl.
*E21B 10/573* (2006.01)

(52) U.S. Cl.
USPC ............................ 175/435; 175/425

(58) Field of Classification Search
USPC ................. 175/434, 435, 425, 426, 428
See application file for complete search history.

(56) References Cited

U.S. PATENT DOCUMENTS

| | | | |
|---|---|---|---|
| 3,497,942 A | 3/1970 | Weiss | |
| 4,684,405 A | 8/1987 | Kolaska et al. | |
| 4,729,440 A * | 3/1988 | Hall | 175/107 |
| 5,342,129 A | 8/1994 | Dennis et al. | |
| 5,379,854 A | 1/1995 | Dennis | |
| 5,452,843 A | 9/1995 | Dennis | |
| 5,477,034 A | 12/1995 | Dennis | |
| 5,498,081 A | 3/1996 | Dennis et al. | |
| 5,499,688 A | 3/1996 | Dennis | |
| 5,524,719 A | 6/1996 | Dennis | |
| 5,544,713 A | 8/1996 | Dennis | |
| 5,566,779 A | 10/1996 | Dennis | |
| 5,630,479 A | 5/1997 | Dennis | |
| 5,641,921 A | 6/1997 | Dennis et al. | |
| 5,647,449 A | 7/1997 | Dennis | |
| 5,662,720 A | 9/1997 | O'Tighearnaigh | |
| 5,816,347 A | 10/1998 | Dennis et al. | |
| 5,848,348 A | 12/1998 | Dennis | |
| 6,004,505 A | 12/1999 | Roy et al. | |
| 6,011,248 A | 1/2000 | Dennis | |
| 6,063,333 A | 5/2000 | Dennis | |
| 6,066,290 A | 5/2000 | Dennis et al. | |
| 6,126,895 A | 10/2000 | Dennis et al. | |
| 6,228,484 B1 * | 5/2001 | Willert-Porada et al. | 428/336 |
| 6,315,066 B1 | 11/2001 | Dennis | |
| 6,488,103 B1 | 12/2002 | Dennis et al. | |
| 6,500,226 B1 | 12/2002 | Dennis | |
| 7,306,059 B2 * | 12/2007 | Ide | 175/107 |
| 7,703,982 B2 * | 4/2010 | Cooley | 384/95 |
| 7,712,549 B2 | 5/2010 | Dennis et al. | |
| 2005/0133277 A1 * | 6/2005 | Dixon | 175/426 |
| 2005/0211702 A1 | 9/2005 | Gigl et al. | |
| 2006/0237234 A1 | 10/2006 | Dennis et al. | |
| 2006/0254830 A1 * | 11/2006 | Radtke | 175/426 |

(Continued)

OTHER PUBLICATIONS

Hsu, Chris, et al.; "Small Studs, Big Impact;" The Fabricator, Sep. 2009 (pp. 28-29).
The Roueche Company, LLC, Products: Welders: Streamline Welders product brochure, copyright 2009 (2 pages).

(Continued)

*Primary Examiner* — Kenneth L Thompson
(74) *Attorney, Agent, or Firm* — Marc A. Hubbard; Hubbard Law, PLLC

(57) ABSTRACT

A wear insert comprised of cemented metal carbide is welded to a workpiece made of steel or cemented metal carbide without causing fracturing of the carbide or creating residual stresses that reduce the impact resistance of the part. The part is fabricated using a microwave sintering process prior to welding.

14 Claims, 5 Drawing Sheets

(56) References Cited

U.S. PATENT DOCUMENTS

| | | | |
|---|---|---|---|
| 2007/0151769 A1* | 7/2007 | Slutz et al. | 175/426 |
| 2008/0142276 A1* | 6/2008 | Griffo et al. | 175/432 |
| 2008/0185189 A1* | 8/2008 | Griffo et al. | 175/433 |
| 2008/0206576 A1* | 8/2008 | Qian et al. | 428/446 |
| 2008/0223623 A1* | 9/2008 | Keshavan et al. | 175/434 |
| 2009/0071727 A1* | 3/2009 | Keshavan et al. | 175/434 |

OTHER PUBLICATIONS

"Water Management is Key to Shale Gas Development," "EPA to Readdress Hydraulic Fracturing," "Water Management for the Barnett and Marcellus," "Frac Water Management—Ecosphere Energy Services," and "Innovative Water Management Technology to Reduce Environmental Impacts of Produced Water," Petroleum Technology Transfer Council, vol. 16, No. 1, Mar. 2010 (pp. 1-7).
Cobalt in Cemented Carbides, Cobalt Facts, copyright 2006, pp. 41-45.

* cited by examiner

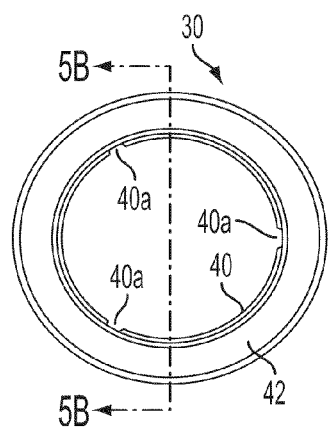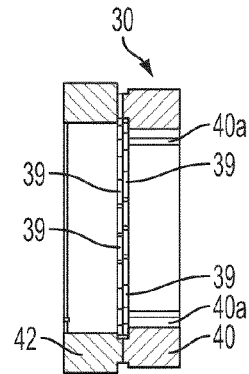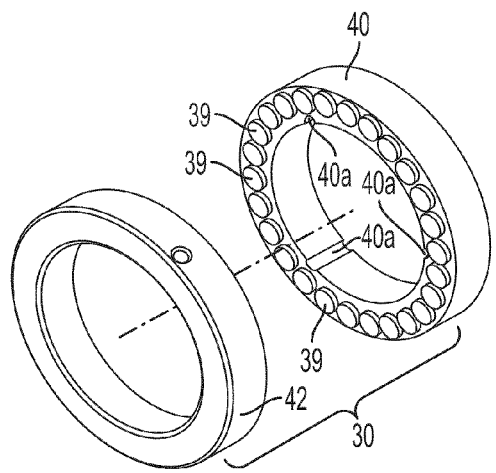
FIG. 5A  FIG. 5B  FIG. 5C
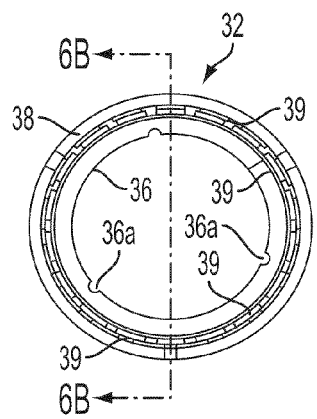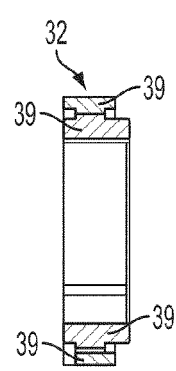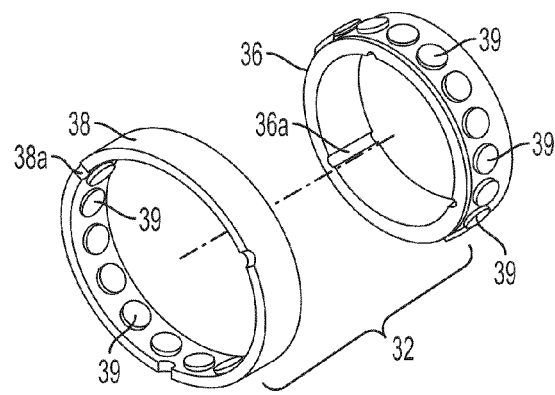
FIG. 6A  FIG. 6B  FIG. 6C

TOOL WITH WELDED CEMENTED METAL CARBIDE INSERTS WELDED TO STEEL AND/OR CEMENTED METAL CARBIDE

BACKGROUND

Cemented metal carbides and other cermets, polycrystalline diamond (PCD), and cubic boron nitride (CBN), and combinations of them, have been used for many years for cutting tools, hard facing, wear inserts, cutting inserts, and other wear parts and surfaces in various types of tools because of their desirable properties of hardness, toughness and wear resistance. Cemented metal carbide refers to a carbide of one of the group IVB, VB, or VIB metals which is pressed and sintered in the presence of a binder of cobalt, nickel, or iron and the alloys thereof. The most common example of a cemented metal carbide used in downhole applications is tungsten carbide (WC). Polycrystalline diamond is made by sintering powdered diamond in the presence of a catalyst, such as a cobalt alloy or nickel, resulting in intercystalline bonding between individual diamond crystals. The diamond can be synthetic or natural diamond, cubic boron nitride, or wurtzite boron nitride as well as combinations thereof. PCD is typically utilized in wear applications as a crown layer attached to a base comprised of cemented WC. Such an insert is sometimes referred to as a polycrystalline diamond compact (PDC).

Drill bits, rock mills and other earth boring tools used in oil and gas exploration are examples of tools that make use of wear resistant inserts for surfaces that will be subject to substantial abrasion and wear. Examples of inserts with abrasion resistant wear surfaces include abrasive jet nozzles, long life wear parts, carbide cutting tools, carbide wire drawing dies, cold heading dies, valve components (including seats), scuff plates, saw blades, deflector plates, milling tools, finishing tools, and various types of components for down hole tools, such as cutters and other inserts for earth boring bits (including rotary and drag bits) and bearing wear surfaces, such as mud-lubricated radial bearings and thrust bearings. An example of diamond bearing comprising a composite having a crown formed of PCD on a substrate of cemented carbide is as described by U.S. Pat. No. 4,729,440. Examples of cutters, bearings, and other types of inserts made from cemented metal carbides and PCD, and methods of manufacturing them, can be found in U.S. Pat. Nos. 6,500,226; 6,315,066; 6,126,895; 6,066,290; 6,063,333; 6,011,248; 6,004,505; 5,848,348; 5,816,347.

Inserts made from cemented metal carbide, PCD and cermets are joined to other components of a tool by either press fitting or brazing the insert. Brazing involves melting between two work pieces a filler metal having a melting point below the melting point of each of the work pieces, thereby forming a bond between the two work pieces. Examples of filler metal used for brazing are various alloys of cobalt. Brazing does not cause melting of either of the work pieces. Welding, on the other hand, requires heating adjacent portions of two work pieces above their respective melting points to form a pool of molten material, called weld pool, resulting in material from each piece inter-diffusing to form a bond that joins the pieces when cooled. Welding can be done either with or without the presence of a filler material.

Generally speaking, welding cemented metal carbide is not feasible or recommended due to stresses caused by heating of the cemented metal carbide. Although cemented metal carbides are very hard, tough, and resistant to wear, they are also relatively brittle. A small amount of strain can lead to its fracture. Furthermore, the more wear resistant, or harder, cemented tungsten carbide is made, the less tough and resistant to fracture it is. Uneven heating of a cemented metal carbide part leads to large temperature gradients across the part, which induces substantial stress across the part due to different degrees of thermal expansion caused by the uneven heating. Additionally, metal carbides also have a substantially different coefficient of thermal expansion as compared to stainless steel, which is the type of metal of which the bodies of and moving parts of down hole tools are fabricated due to is corrosion-resistance, strength and machinability. Heating a cemented metal carbide part and a steel part hot enough to melt the respective materials at the boundary between the two pieces creates substantial stress on the cemented metal carbide part when it cools. The stress typically leads to fracturing of the cemented metal carbide part during welding. If it does not immediately fracture, the residual stress within the part leads to substantially heightened susceptibility to fracturing when loaded, making the part not feasible for use, especially on downhole tools likely to experience high impact loads.

SUMMARY

The invention relates to a process and apparatus for welding a part, such as a wear insert, made of cemented metal carbide to a workpiece made of an alloy of a Group VIII transitional metal (such as steel) or cemented metal carbide without causing fracturing of the carbide or creating residual stresses that reduce the impact resistance of the part. The part is fabricated using a microwave sintering process prior to welding to have a higher modulus of elasticity as compared to a part containing the same materials fabricated using conventional high temperature and high pressure sintering methods.

In one example a wear surface insert for a bearing for an earth boring tool is fabricated by sintering an insert made from cemented tungsten carbide in a microwave furnace. The insert is welded to a workpiece forming part of a downhole tool. In another example, a bearing of an earth boring tool is fabricated by sintering in a microwave furnace a compact formed of layer particles of diamond on a substrate of tungsten carbide, the resulting sintered compact being joined to a steel component of the tool by welding.

BRIEF DESCRIPTION OF THE DRAWINGS

FIGS. 5A, 5B and 5C illustrate an example of a thrust bearing for a downhole tool, such as a motor, turbine, rock mill, or a tri-cone rotary drill bit. FIG. 5A is a plan view, FIG. 5B is a cross-section of FIG. 5A, taken along section line 5B-5B, and FIG. 5C is an exploded, perspective view.

FIGS. 6A, 6B and 6C illustrate an example of a radial bearing for a downhole tool, such as a motor, turbine, rock mill, or a tri-cone rotary drill bit. FIG. 6A is a plan view, FIG. 6B is a cross-section of FIG. 6A, taken along section line 6B-6B, and FIG. 6C is an exploded, perspective view.

DETAILED DESCRIPTION OF EXEMPLARY EMBODIMENTS

In the following description, like numbers refer to like elements.

Figure 1:
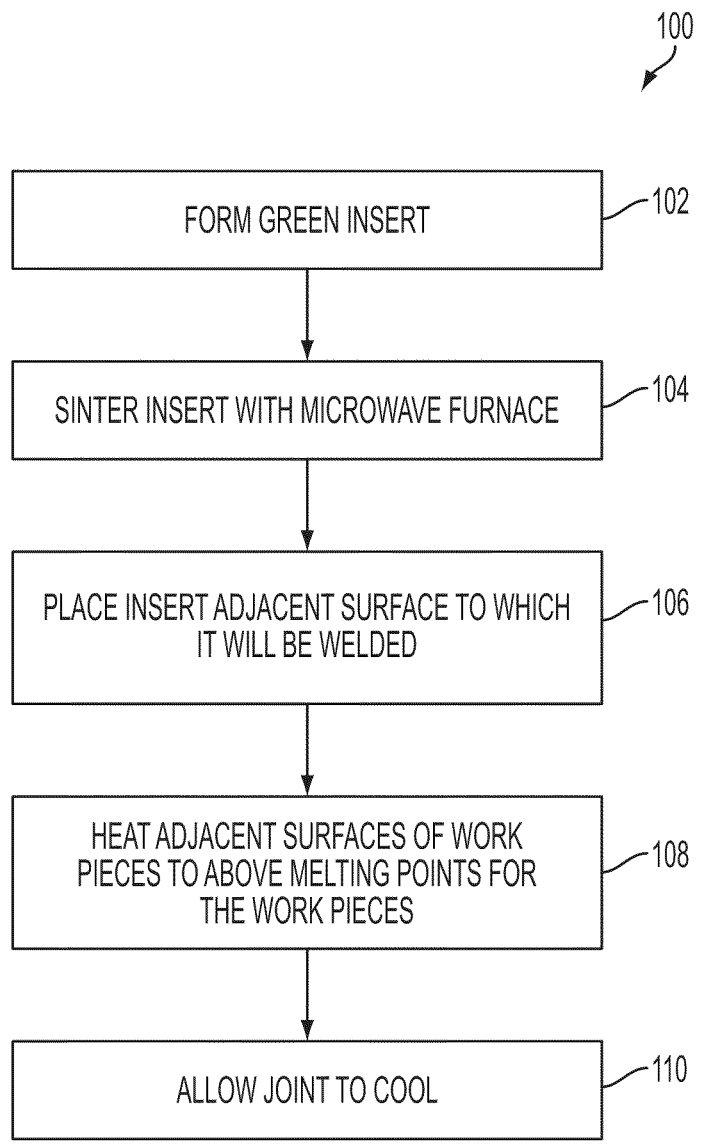
FIG. 1 is a flow chart illustrating a process for manufacturing a tool with a wear surface insert made from microwave sintered PCD, cemented carbide or a cermet.

FIG. 1 illustrates the basic steps comprising a process 100 for welding a portion of an insert made at least in part of cemented carbide to an element of a tool, or a component of a tool, made of steel.

At step 102, loose grains of metal carbide and a metal binder are combined to form a homogenous mixture, which is then shaped or formed into a "green" part that has very near the dimensions and shape of a desired cemented metal carbide part. The green part is formed, for example, by compacting the powders into a mold by cold pressing. It may also be precast with a sacrificial wax if necessary. One example of a metal carbide is tungsten carbide. Typically, the metal binder is a metal alloy containing about 80 to 96% cobalt. Additional materials can also be added.

After it is formed, the part is then sintered at step 104 using microwave radiation to heat the part to a point that is below the melting temperature of the metal carbide, but high enough to cause the metal binder to melt throughout the matrix of metal carbide grains, resulting in the particles of carbide fusing or adhering to one another to thereby form a single, solid mass.

Figure 2:
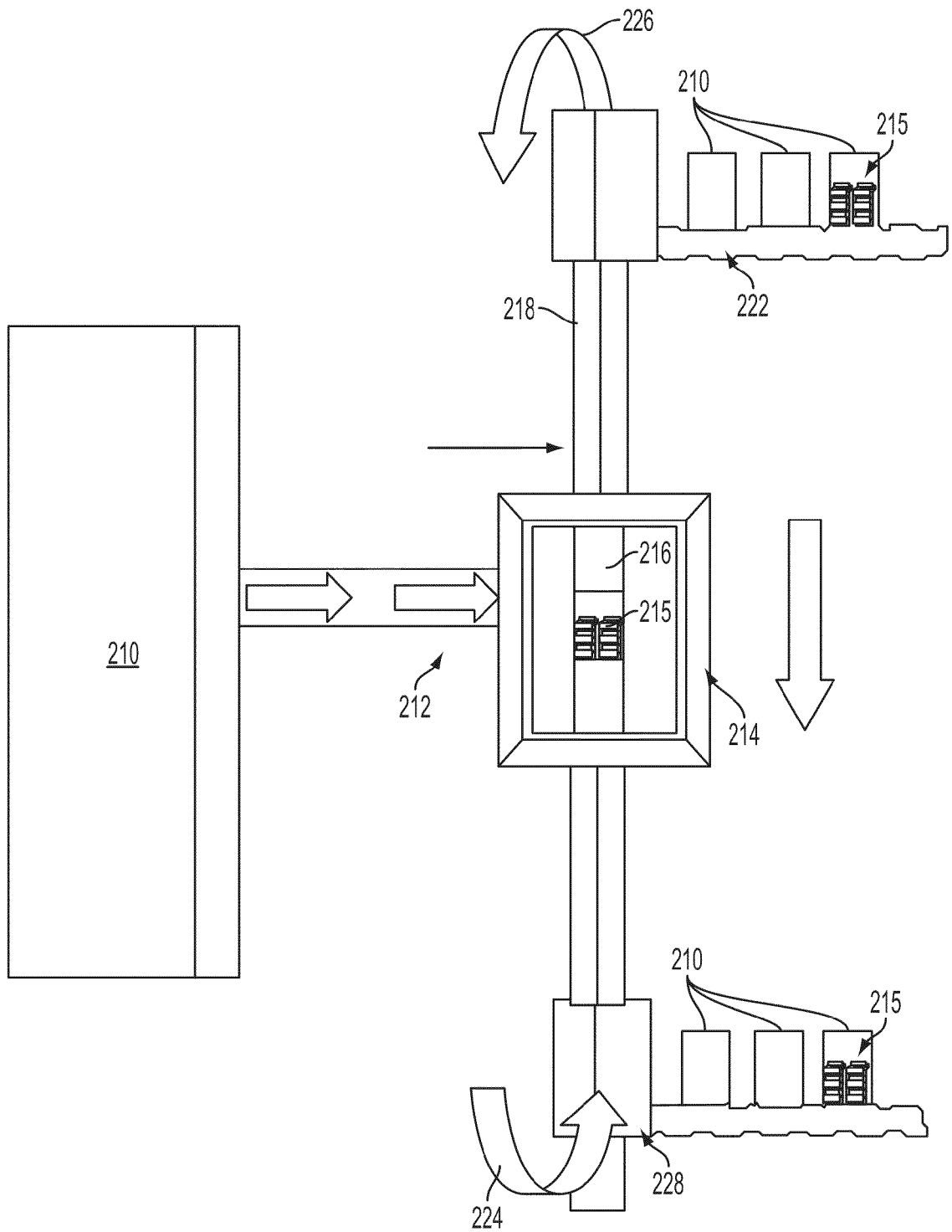
FIG. 2 is a schematic diagram of a microwave furnace for sintering cemented metal carbide inserts.

FIG. 2 is an example of a furnace for a continuous microwave sintering process. Electromagnetic waves generated by microwave energy generator 210 are transmitted through waveguide 212 to chamber 214. One or more parts 215 to be sintered are placed inside crucibles 216. The green parts are placed or stacked in each crucible. The crucibles are then transported through chamber 214, where they are subjected to microwave energy. The crucibles are preferably made from a material that has a very low coupling with microwave energy and thus is somewhat transparent to the microwaves that are used to heat the material from which the parts are made. Examples of such materials are silicon nitride, alloys of silicon nitride, including an alloy composed of silicon nitride and aluminum oxide called "sialon," hexagonal boron nitride, and low thermal expansion ceramics like sodium zirconium phosphate.

In the illustrated example, gravity is used to transport the crucibles through the microwave by stacking them vertically and moving the stack through chamber 214 by removing the bottom-most crucible one at a time. A vertical tube 218 or other structure may be used to keep the crucibles stacked and provide an enclosed environment for an appropriate atmosphere. Crucibles are conveyed into an opening at the top of the tube using a conveyer 220 or any other type of transport or conveyance means. The crucibles exit an opening in the bottom of the tube onto conveyor 222. An inert or reducing gas is introduced into the tube near the bottom of the tube and exits the tube near the top of it, as indicated by arrows 224 and 226. A structure 228 functions to pass the crucibles from the tube while preventing air from entering the tube and gas from spilling out of the tube. A similar structure 230 is located at or near the top end of the tube for allowing crucibles to be inserted into the tube while keeping air out of it. Additional details of this type of continuous process system are contained in U.S. Pat. No. 6,004,505 and related patents, which are incorporated herein by reference.

Microwave heating to sinter metal carbides offers several advantages. It shortens sintering times. Shorter sintering times result in less chemical and phase change in the metal binder, which is typically cobalt or an alloy containing cobalt. Typical conventional high pressure, high temperature ("HP/HT") or hot isostatic pressure ("HIP") sintering (see, for example, U.S. Pat. No. 4,684,405) require temperatures of 1400 degrees centigrade for as long as 12 hours, whereas microwave sintering involves sintering times lasting on the order of 2 to 5 minutes. Shorter sintering times also result in smaller changes in the size of the grains. Smaller changes in the grain size yield more predictable and consistent carbide grain structures. More even heating is possible with microwave, which results in more uniform shrinkage of the part and more uniform distribution of the binder during cooling. Microwave sintering also allows for uniform cooling after sintering, which allows for better management of stresses within the part and better phase control of the metal binder. A microwave sintered metal carbide part typically possesses higher modulus of elasticity, yield strength, and impact strength and greater thermal and electric conductivity as compared to a part having the same starting materials sintered using conventional HP/HT and HIP methods.

A polycrystalline diamond compact insert that is comprised of a microwave-sintered, metal carbide substrate and a crown or working surface layer made of polycrystalline diamond can be made in any one of several ways.

In a first way, a body of cemented metal carbide and a crown of PCD, CBN or WBN are separately sintered and joined by brazing. The cemented carbide body is sintered using microwave sintering, as described above. The crown is formed from micron-sized diamond, CBN or WBN crystals engineered for specific properties such as abrasion resistance and impact strength that are blended to a controlled distribution and then sintered using HP/HT, HIP or microwave radiation. The two pieces are then bonded by brazing. The brazing of the crown to the substrate could, optionally, occur after the cemented carbide base is welded to a steel substrate.

In the second way, a layer of powdered carbide and metal binder and a layer of micron-sized diamond, CBN or WBN crystals are placed in the same mold. The layer of crystals may or may not include a metal binder. Between the layer of crystals and the carbide layer is optionally placed one or more transition layers that are comprised of a mixture of diamond particles and metal carbide, with or without the presence of a metal binder between the layer of crystals and the carbide layer. The molded part is then sintered using microwave radiation.

In a third way, micron-sized diamond, CBN or WBN crystals engineered for specific properties such as abrasion resistance and impact strength are blended to a controlled distribution and placed with a cemented carbide substrate, which has been previously sintered using microwave radiation, in a refractory container called a cell. The cell is placed in a computer controlled press at pressures of approximately one million pounds per square inch and temperatures of about 2600 degrees Fahrenheit. While under high pressure, a current is passed through the cell to create high temperature, and the diamond or CBN crystals fuse together to form an integral, superabrasive, polycrystalline layer bonded to the carbide, with uniform properties in all directions. The polycrystalline diamond layer can optionally be made more thermally stable by either entirely leaching or partially leaching metal catalyst used for sintering the diamond particles.

U.S. Pat. Nos. 5,641,921, 5,848,348, 6,004,505, 6,011,248 and 6,500,226, which are incorporated herein by reference, disclose additional information about processes for microwave sintering metal carbides and forming polycrystalline diamond compacts. Other examples of inserts containing at least a region or portion made from microwave sintered carbide include inserts with tungsten carbide bodies reinforced with thermally stable polycrystalline diamond (TSP) and dispersed diamond grit shown in U.S. Pat. No. 6,315,066, which is also incorporated herein.

Referring now only to FIG. 1 the final steps in the process 100 are, at step 106, positioning a surface of a portion of the insert made of microwave-sintered, cemented carbide adjacent to the surface of the part to which it will be welded, applying heat to the adjoining surfaces to melt the surfaces and cause inter-diffusion of the melted material at step 108, and then allow the weld to cool at step 110.

Figure 3A:
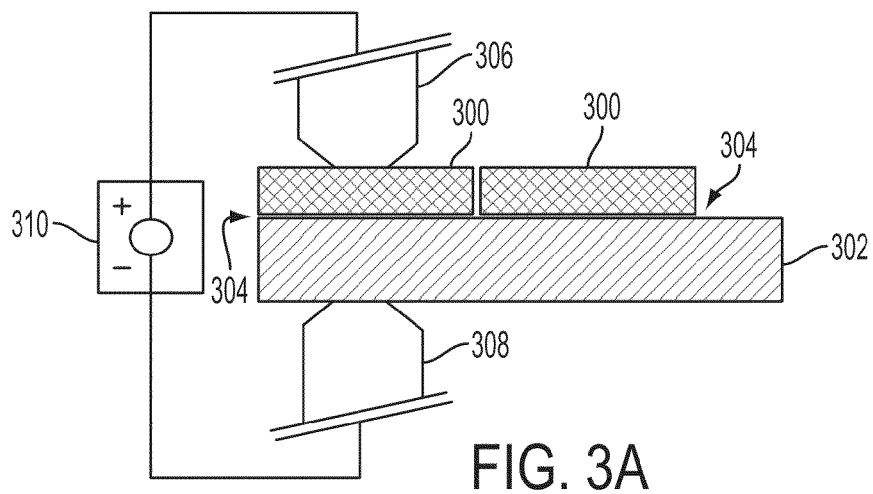
FIG. 3A schematically illustrates one configuration of a resistance welder for welding a cemented carbide insert to a stainless steel part.

In FIG. 3A an insert 300 made entirely of microwave-sintered cemented metal carbide is placed during step 106 adjacent to workpiece 302 and held, such as by clamping, adjacent to the workpiece by electrodes 306 and 308 of a resistance welder 310. The workpiece 302 in this example, is made of stainless steel or any other alloy made from a Group VIII metal or microwave sintered cemented metal carbide. One example of a resistance welding machine suitable for use is the Streamline, LPW Series resistance spot/projection welder sold by the Roueche Company, LLC. The workpiece 302 comprises, for example, a component or body of a downhole tool. A plurality of microwave-sintered, cemented metal carbide parts can be welded to the same work piece. Welding multiple microwave sintered inserts to the same workpiece effectively extends the size of the wear surface area.

A pulse of electric current is applied to electrodes by the resistance welder 310. The resistance to current flow at the boundary between the pieces causes a generation of heat within the immediate vicinity of the boundary, and raises the temperature of the steel and the cemented metal carbide high enough to result in melting of the respective pieces immediately adjacent the boundary. A weld puddle forms between the insert 300 and the workpiece 302, resulting in the cemented carbide substrate and steel inter-diffusing in a region 304 where the two pieces adjoin, thereby forming a weld once the joint is allowed to cool at step 110. A filler material, such a cobalt or nickel, or an alloy containing cobalt and/or nickel, may be placed between the two pieces during welding, but it is not necessary.

The electrodes can be placed in any position that results in a current flowing across the boundary of the pieces being welded.

Figure 3B:
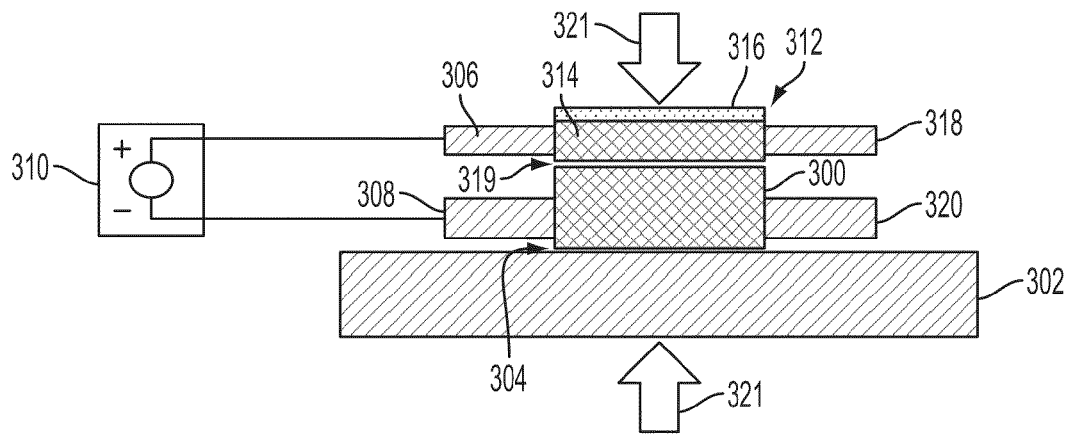
FIG. 3B schematically illustrates one configuration of a resistance welder for welding a polycrystalline diamond compact (PDC) insert to a stainless steel part.
Figure 3C:
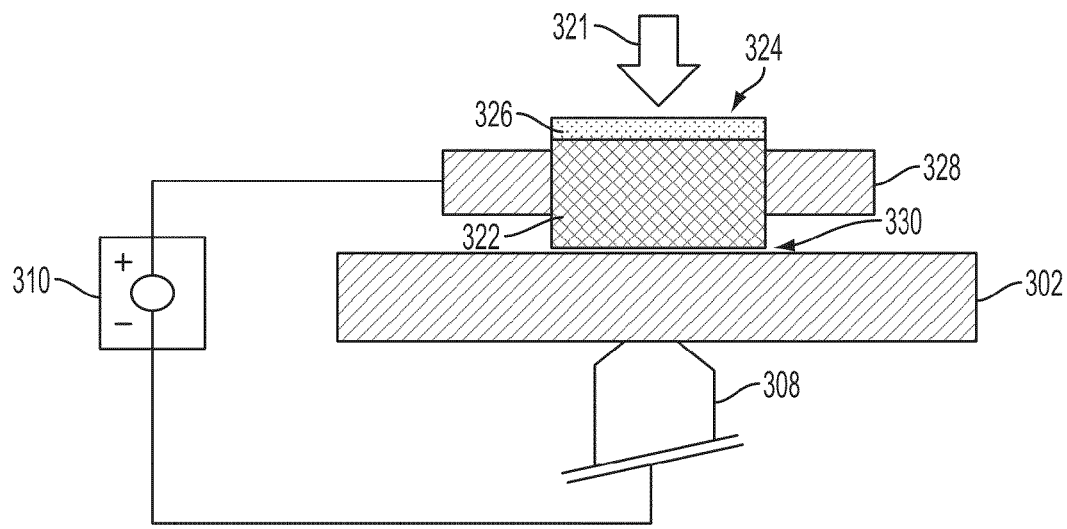
FIG. 3C schematically illustrates an alternate configuration for welding a PDC to a stainless steel part.

FIGS. 3B and 3C illustrate two approaches to welding to a part 302 made of stainless steel to a PDC insert 312 having a microwave-sintered, cemented carbide substrate 314 and a sintered polycrystalline crown 316. Polycrystalline diamond and similar materials conduct electricity poorly. In FIG. 3B, microwave sintered, cemented metal carbide insert 300 is welded first to part 302 in the manner shown in FIG. 3A. The substrate 314 of the PDC 312 is then welded to the insert by placing collet 318 around the substrate 314 and collet 320 around the insert 300 and forming a weld 319 using resistance welding. Collets 318 and 320 preferably encircle the substrate and are connected to the resistance welder 310 in place of the electrodes 306 and 308 (FIG. 3A). The PDC insert 312 and the metal carbide insert 300 need to be held together, as indicated by arrows 321, by a clamp or similar mechanism. As shown in FIG. 3C, a microwave-sintered, cemented metal carbide substrate 322 of PDC insert 324, which has a top layer or crown 326 of PCD can also be directly welded to a stainless steel part 302 by placing around the substrate 322 collet 328 and connecting resistance welder 310 to electrode 308 and collet 328. A clamping force, indicated by arrow 321, is applied to hold the parts together. The substrate 322 is made thicker to accommodate the collet 328. Current is appended to form weld 330.

As an alternative to resistance welding, a piece of microwave-sintered, cemented metal carbide can be welded to another piece of the microwave-sintered, cemented metal carbide or to a Group VIII metal alloy using a capacitive discharge welder or other type of welder that delivers a pulse of electrical current that causes heating in the immediate vicinity of the two surfaces that will be joined by the weld.

Figure 4A:
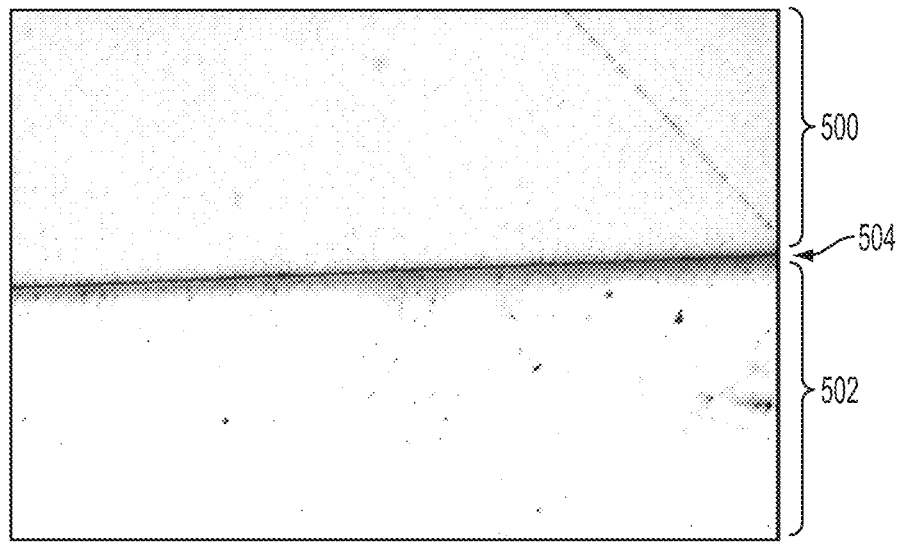
FIG. 4A is a photograph of a polished cross section taken through a microwave-sintered, cemented tungsten carbide insert welded to a stainless steel part at 50× magnification.
Figure 4B:
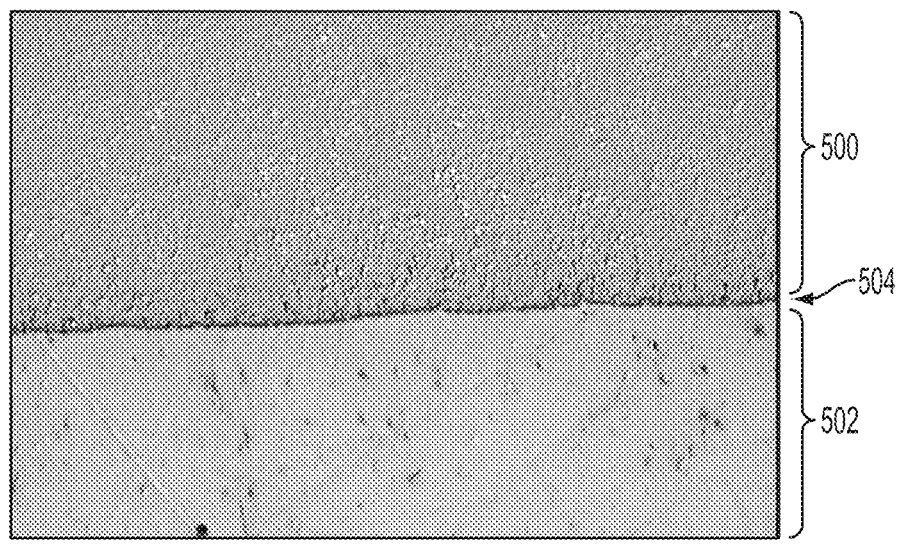
FIG. 4B is a photograph of the polished cross section of FIG. 4A at 200× magnification.

FIGS. 4A and 4B are photographs of a polished cross-section of a microwave-sintered, tungsten carbide and cobalt insert 400 welded to a piece of 4140 stainless steel 402 using a streamline, LPW Series resistance welder sold by the Roueche Company and the method described in connection with FIG. 1. The photograph of FIG. 4A is taken along the weld at a magnification of 50×, and the photograph of FIG. 4B is taken along the weld at a magnification of 200×. Before sintering, the insert was comprised of a mixture of 1 to 2 micron tungsten carbide powder and cobalt. The amount of cobalt contained in the body was 13% by weight. The insert was sintered using a microwave furnace substantially as described in connection with FIG. 2. After sintering, the tungsten carbide insert was welded to a piece of 4140 stainless steel using a Streamline, LPW Series resistance spot/projection welder sold by the Roueche Company, LLC.

Based on the photos, the resulting weld 404 appears to be approximately 2 to 3 microns thick. Cobalt, the cementing metal in the tungsten carbide, appears to have melted and wet the tungsten carbide grains along the boundary of the insert adjacent to the stainless steel, without substantially affecting the integrity of the metal carbide matrix, even in the immediate vicinity of the weld. The melted cobalt appears also to have inter-diffused with a thin layer of melted stainless steel immediately adjacent the boundary between the two pieces. However, the tungsten carbide grains in the sintered part do not appear to have been substantially disturbed, such as by the carbide dissolving into the metal binder and precipitating into the weld or by the melting of the metal binder much beyond the immediate surface of the sintered tungsten carbide. The weld is therefore predominantly of a mixture of cobalt and stainless steel. The part did not fracture during or after welding.

FIGS. 5A-5C and 6A-6C illustrate, respectively, examples of a thrust bearing and of an axial bearing having bearing surfaces, each of the bearing surfaces being comprised of a plurality of inserts 39. In these embodiments, each of the inserts is comprised of a microwave-sintered cemented metal carbide substrate, for example a tungsten carbide insert cemented with cobalt. Thrust bearing 30 is comprised of two races 40 and 42. Axial bearing 32 is similarly comprised of two races 36 and 38. Each of the races is made from stainless steel. The microwave sintered metal carbide inserts are welded to the race in the manner described above in connection with FIGS. 1, 2 and 3A-3C.

To achieve the necessary curvature the inserts can be cast with the curvature on the top and bottom and milled as necessary to achieve the desired geometry. Alternately, the insert can be cast with a flat bottom that is set on a complementary flat surface that is machined in the race.

Except for the welding of the microwave sintered, cemented metal carbide inserts to the races, the bearings in these figures are substantially similar to bearings found in the prior art, and are only included to be representative of such bearings for downhole tool applications. Another example of bearing surfaces comprised of PCD is a roller cone drill bit described in U.S. Pat. No. 4,729,440. Using the process described herein, a PDC with microwave-sintered, cemented metal carbide substrate is substituted for the polycrystalline diamond compacts used for the bearing surfaces described in this patent, and then welded rather than brazed or mechanically press fitted, to the stainless steel parts of the tool.

The foregoing exemplary embodiments employ, at least in part, certain teachings of the invention. The invention, as defined by the appended claims, is not limited to the described embodiments. Alterations and modifications to the disclosed embodiments may be made without departing from the invention. The meaning of the terms used in this specification are, unless expressly stated otherwise, intended to have ordinary and customary meaning and are not intended to be limited to the details of the illustrated structures or the disclosed embodiments.

What is claimed is:

1. A tool, comprising:
    a first element having at least one portion thereof made of steel; and
    a wear insert having at least one portion thereof made of microwave-sintered metal carbide cemented with a metal binder;
    wherein the at least one portion of the first element made of steel and the at least one portion of the wear insert made of microwave-sintered metal carbide cemented with a metal binder have adjacent surfaces joined by a weld extending along at least a portion of the adjacent surfaces comprising an inter-diffusion of the metal binder and the steel.

2. The tool of claim 1, wherein the first element comprises a race of a bearing, and wherein the wear insert comprises a bearing surface joined to the race.

3. The tool of claim 1, wherein the down hole tool comprises a drill bit having a plurality of teeth.

4. The tool of claim 1, wherein the wear insert comprises a polycrystalline diamond compact, and the portion forms a substrate supporting a layer of sintered polycrystalline diamond.

5. The tool of claim 1, wherein the wear insert is comprised of tungsten carbide and wherein the metal binder is comprised of an alloy of cobalt.

6. The tool of claim 1, wherein grains of metal carbide from the first element and the wear insert have not melted and inter-diffused with the cobalt and the steel in the weld.

7. The tool of claim 1, wherein the steel is stainless steel.

8. A tool comprising:
    a first element having a portion comprised of microwave-sintered metal carbide cemented with a metal binder; and
    a wear insert having at least a portion thereof made from microwave-sintered metal carbide cemented with a metal binder;
    wherein the portion of the first element made of microwave-sintered metal carbide with a metal binder and the portion of the wear insert made from microwave-sintered metal carbide cemented with the metal binder have adjacent surfaces joined by a weld extending along at least a portion of the adjacent surfaces comprising an inter-diffusion of the metal binder.

9. The tool of claim 8, wherein the wear insert comprises a polycrystalline diamond compact, and the portion of the wear insert comprising the microwave-sintered metal carbide cemented with the metal binder forms a substrate supporting a layer of sintered polycrystalline diamond.

10. The tool of claim 8, wherein the first element comprises a race of a bearing, and wherein the wear insert comprises a bearing surface joined to the race.

11. The tool of claim 8, wherein the tool comprises a drill bit having a plurality of teeth.

12. The tool of claim 8, wherein the wear insert comprises a polycrystalline diamond compact, and the portion of the insert comprising the microwave-sintered metal carbide forms a substrate supporting a layer of sintered polycrystalline diamond.

13. The tool of claim 8, wherein the wear insert is comprised of tungsten carbide and wherein the metal binder is comprised of an alloy of cobalt.

14. The tool of claim 8, wherein grains of metal carbide from the first element and the wear insert have not melted and inter-diffused with the cobalt in the weld.

* * * * *